Dec. 4, 1962

J. L. M. DUBOUCHET 3,066,490

REGULATING OF COMPENSATED FLOATS FOR
CONTROL OF AUTOMATIC GATES

Filed Feb. 10, 1959

INVENTOR.
Jacques Leon Marcel Dubouchet
BY
Corey, Hart & Stemple
ATTORNEYS

Dec. 4, 1962  J. L. M. DUBOUCHET  3,066,490
REGULATING OF COMPENSATED FLOATS FOR
CONTROL OF AUTOMATIC GATES
Filed Feb. 10, 1959  2 Sheets-Sheet 2

INVENTOR.
Jacques Leon Marcel Dubouchet
BY
Cosey, Hart & Stemple
ATTORNEYS

United States Patent Office 3,066,490
Patented Dec. 4, 1962

3,066,490
REGULATING OF COMPENSATED FLOATS FOR CONTROL OF AUTOMATIC GATES
Jacques Leon Marcel Dubouchet, Birmandreis, Algeria, assignor to Etablissements Neyrpic, Grenoble, France, a corporation of France
Filed Feb. 10, 1959, Ser. No. 792,315
Claims priority, application France Feb. 12, 1958
10 Claims. (Cl. 61—25)

This invention relates to apparatus for controlling liquid levels and more particularly to automatic gates of the type employed for maintaining constant in a canal, conduit, or the like, the upstream or downstream level of the liquid therein.

Structures of the type with which the present invention are concerned usually include a gate mounted to rotate or oscillate about a stationary axis and maintained balanced in a definite position corresponding to a predetermined height of the liquid level to be regulated by means of a float movable concomitantly with the gate about the same axis. Structures of the indicated type are usually constructed so that the center of gravity of the whole structure including the gate and the float is located above and offset from the axis of rotation of the structure. It has been found that it is possible to attain a single preferential position of the center of gravity at which the gate may be in equilibrium for two definite positions corresponding to any two predetermined heights of the level to be regulated. This preferential position of the center of gravity may be found by first determining the position at which the center of gravity is to be established for maintaining equilibrium of the structure at one position of the gate corresponding to one of the levels to be regulated, and then determining that position of the center of gravity at which equilibrium of the structure at the second position of the gate corresponding to the second level to be regulated can be maintained without destroying the equilibrium of the gate when the latter resumes its first position. It is possible, theoretically, to calculate very accurately this desired center of gravity of the structure and thus determine the exact equilibrium of the structure under certain operating conditions. However, from the practical viewpoint, this calculation can only provide a rough approximation because of the variations which will occur in the actual elements of the structure i.e. the variations in the masses of the welds holding the parts together, the variations in the dimensions of the materials forming the elements, etc.

Accordingly, it is the principal object of the present invention to provide an improved gate construction which can be readily established at its place of use without the necessity of any special tools or especially skilled workers to provide accurate and exact control for the operating conditions for which it was designed. In accordance with the invention, the structure is provided with a ballast container having a plurality of compartments or chambers of suitable sizes and dimensions to enable the ballast to be transferred readily from one to the other in establishing equilibrium of the structure in the two aforesaid positions of the gate corresponding to the two liquid levels to be regulated. The compartments may be arranged in any suitable manner with relation to the gate and the float, but preferably are provided in the interior of the float. However, their arrangement is such with relation to each other that when the gate is set in the first position for determining the initial position of the center of gravity, such compartments will be vertically disposed. With the gate so set, ballasting material of any suitable type, such as scrap iron, metal bars, crushed rock, etc., is placed in either one or all of the compartments until a condition of equilibrium is attained. There is thus established for the entire structure the initial position of the center of gravity which will be on a certain vertical with relation to the axis of rotation of the gate structure. To find the new condition of equilibrium for the second position of the gate for a given level to be regulated, which second level may be identical with or different from the first level, the ballast material is transferred from one compartment to the other in accordance with the reactions of the gate until the new equilibrium is obtained. Having in accordance with the invention fixed the disposition of the compartments or tanks according to a certain vertical, the result of the transfer of the ballast in the second operation, is to effect a displacement of the center of gravity of the entire structure along a vertical line passed through the first position of the center of gravity. Thus the equilibrium already obtained by the initial position of the center of gravity, will not be destroyed while the center of gravity is being shifted to the preferred point corresponding to the equilibrium sought for the valve for both positions of the gate thereof.

It is believed that a better understanding of the invention, as well as the advantages and novel features thereof, will be obtained from the following description when read in connection with the accompanying drawings which illustrate by way of example and not limitation the manner in which the invention may be practiced. In the drawings.

Figure 4:
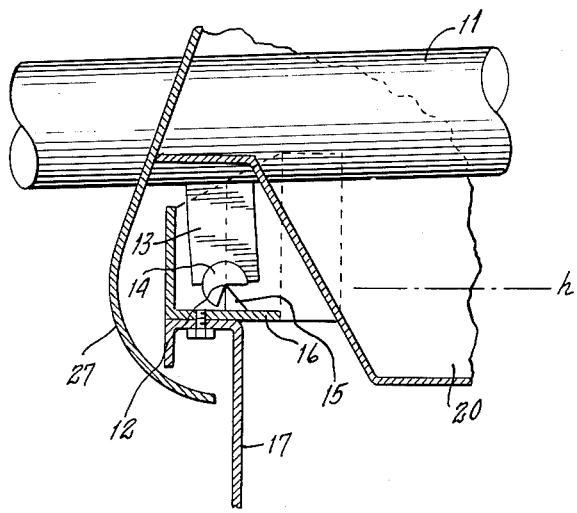
FIG. 4 is a detailed view, partly in section, of the means for pivoting the gate, the parts thereof being disposed in the position indicated in FIG. 2.

In the drawings, the reference numeral 10 designates the gate apron which is supported by a pair of parallelly spaced tubular members or levers 11 mounted to oscillate or rotate as a unit about an axis 12. As is shown more clearly in FIG. 4, each of the support members 11 has welded thereto a depending vertical plate 13 provided at its lower end with a semi-circular seat to which is welded a fulcrum member 14. The two members 14 rest on a pair of spaced fulcrums constituted of two triangularly-shaped knives 15 mounted in aligned relation on an angle iron 16 which is supported at its ends by spaced upstanding brackets or plates 17 rising from the bottom of the liquid conduit on which they are supported. As above indicated, FIG. 4 shows the parts in the relation they have when the gate is completely closed. When the gate is opened, the support members 11 and fulcrum members 14 will rotate in a clockwise direction about the aligned edges of the knives 15 from the positions shown in FIG. 4.

The support members 11 carry on the other side of the axis 12, a float generally designated 20 and formed of two side walls 21, a plane, substantially perpendicular inner end wall 22, and a curved outer end wall 23 of substantially greater height than rear wall 22 and extending above and below the latter so that the outer end of the float is substantially larger than the inner end thereof. The float, with reference to the position of the gate structure shown in FIG. 1, further includes an inclined bottom wall 24, a substantially horizontal top wall portion 25 and an inclined top wall portion 26, the latter of which extends down over inner end wall 22 to form a deflector 27. It will be noted that the support members 11 extend through inner end wall 22 and top wall portion 26 and are welded to the same and to the outer end wall 23. It will also be noted that the means for pivotally supporting the gate structure are housed between the inner end wall 22 and the protruding deflector portion 27 of top wall portion 26. The several walls of the float 20 may be made of any suitable material such as sheet iron and welded or otherwise secured together into a liquid tight float member.

Figure 1:
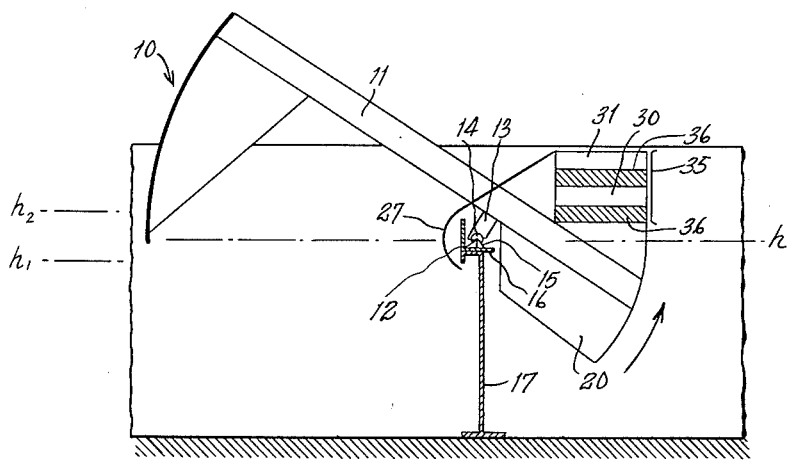
FIG. 1 is a schematic view showing in elevation a gate structure constructed in accordance with the invention to maintain a constant downstream liquid level, the gate being shown in completely open position.

The float 20 includes in the upper portion thereof a plurality of ballast tanks or compartments 30, 31 formed by two horizontal partitions 32, 33 extending in parallelism with top wall portion 25 and secured at their ends to the side walls 21, and by a vertical partition 34 of the same length. It is to be noted that the partitions 32, 33 and 34 are arranged within the float 20 so that the two ballasting tanks 30, 31 are disposed in superposed, vertical relation when the gate is in the completely open position as shown in FIG. 1 of the drawings. Entry to the tanks 30, 31 is attained through an opening provided in the outer end wall 23 and normally closed by a liquid-tight cover 35.

It will be understood from the foregoing, that in constructing the gate structure of this invention, the mass of the structure and the position of its center of gravity is calculated beforehand according to methods known to the art. This calculation provides an approximation of the mass and the position of the ballast which it will be necessary to add at the installation for the exact equilibrium of the gate. This calculation also enables the determination according to known methods of the maximum dimensions and the position of the ballast compartments within the float. Therefore, when installing the gate structure, it is possible to readily balance it in a very precise manner, in the following manner. The gate is first positioned in its completely open position as shown in FIG. 1 with the axis of rotation thereof located at the level $h$ to be maintained. The installer then introduces into one or both of the compartments 30, 31 the exact ballast 36 in FIG. 1 necessary for a first equilibrium and which has been roughly determined by the calculations. The ballast 36, as previously indicated is composed of a separable mass of material such as scrap iron, and it is arbitrarily loaded into the compartments without being particular as to the distribution thereof between the compartments or whether it is disposed in approximately uniform layers in either of such compartments. Sufficient of the ballast is added until the gate is in equilibrium in its fully opened position. In this condition of the gate the moment produced by the weight of the ballast 36 and the unsubmerged portion of the float 20 will balance the opposing moment of the gate 10 and the thrust of the liquid on the immersed portion of the float 20.

In carrying out the second step of calibrating the structure, the gate is first moved to the fully closed position without changing the height $h$ at which the liquid level is to be maintained on the downstream side of the gate. The ballast is then shifted from one compartment to the other without changing its mass and until equilibrium is reached for the second or closed position of the gate. During this shifting of the ballast the reactions of the gate are carefully watched in order that the variation of the pressure of the water on the float 20 due to the movement of the gate from its completely opened position as shown in FIG. 1 to the fully closed position thereof shown in FIG. 2, will be properly compensated for and when this condition is reached the gate will be in equilibrium. As the two compartments 30, 31 are superposed in vertical relation when the gate is in the first position of setting, that is, the fully opened position shown in FIG. 1, the shifting of the ballast in such compartments moves the center of gravity of the whole structure vertically in the said first position of setting. Thus one is assured during the displacement of the ballast in the course of the second operation, of not modifying the results of the first equilibrium. The gate thus set will be balanced with zero decrement for the open and closed positions corresponding to the downstream level at the height $h$ to be secured.

The type of gate structure disclosed in the drawings and hereinabove described is utilized to maintain a constant level downstream from an orifice so long as the upstream water supply remains adequate. It will be understood from the foregoing that the weight of the gate tends to open it and the thrust of the hydraulic forces on the float tend to make it close. As a result of the adjustments above described, the gate is in equilibrium whatever its position so long as the level of the water downstream remains at the same height as that of the axis 12 of the gate. This condition, however, can only be maintained if the flow section controlled by the gate corresponds exactly to the discharge below the gate. The gate can therefore only have one stable position at a time, namely, that position at which the correct flow required for maintaining the desired level occurs. Thus, after the gate has been balanced in the manner hereinabove indicated, the apron 10 thereof will move to that position at which the incoming flow permitted thereby will maintain the downstream water level at the same height as the gate axis 12 for the amount of water which is being demanded downstream. When the downstream level falls below that height, the gate will open further to permit an increased flow of water past the apron 10 thereof and will remain open until the controlled level is again reached, whereupon the gate will close to a degree depending upon the downstream rate of flow. On the other hand, if the downstream demand is reduced causing the downstream level to rise above the height of the gate axis, the gate will close to restrict the flow of water past the apron 10 until the controlled level is again restored. It will be evident therefore, that the gate completely frees the orifice it controls when the downstream demand discharge reaches the maximum flow capacity of the installation, and closes such orifice for zero discharge of water therethrough.

Figure 2:
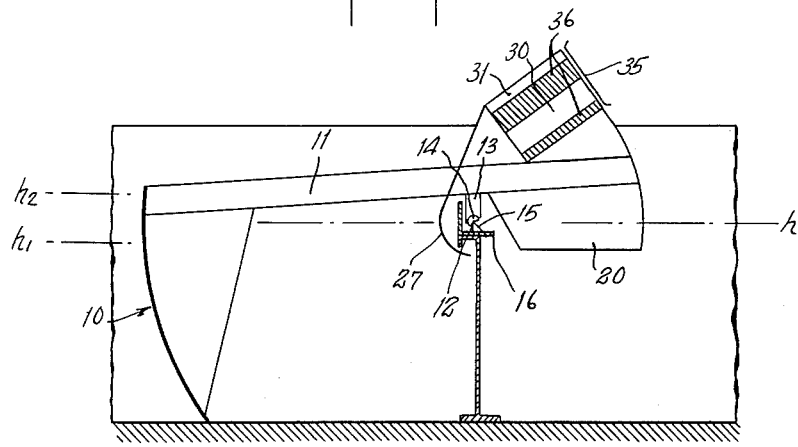
FIG. 2 is a view similar to FIG. 1 but showing the gate in its completely closed position.
Figure 3:
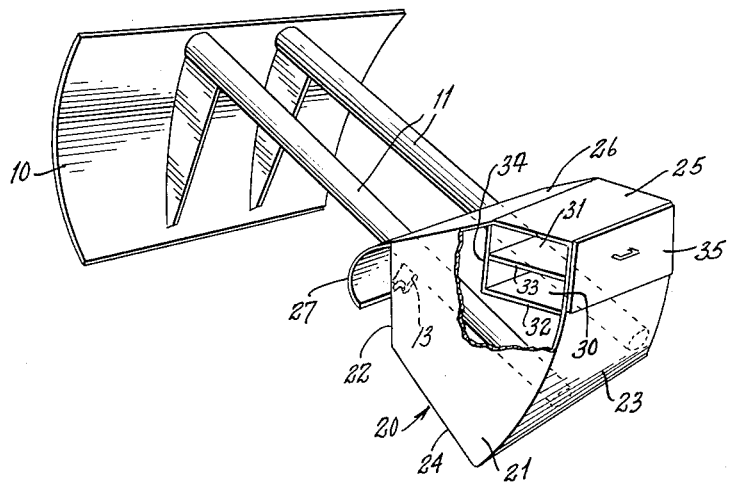
FIG. 3 is a perspective view showing in more detail the gate structure illustrated in FIGS. 1 and 2.

While the critical level of the apparatus disclosed in FIGS. 1 and 2 has been described as the level $h$ of the axis of rotation, a variation of such level termed the "decrement" of the apparatus in either the positive or negative direction and of any desired amount may be attained by constructing the apparatus to operate between two levels of reference judiciously chosen as a function of the role which the gate must play. For example, it is possible in the case of the above described gate to effectuate the equilibrium with a slight positive decrement by operating with two levels of reference, $h_1$ and $h_2$ at heights very near each other and respectively below and above the level $h$ to be maintained, as indicated in FIGS. 1 and 2 of the drawings. In calibrating the apparatus to attain this result, the setting operations above described are performed in the same manner but the first setting in the completely open position (FIG. 1) is made with the liquid level established at the height of the reference $h_1$ slightly below the level $h$ to be maintained, while the second setting in the completely closed position (FIG. 2) is made with the liquid level established at the height of the reference $h_2$ slightly above the level $h$ to be maintained. Other decrements may be obtained in a substantially similar manner as will be understood by those skilled in the art.

While I have illustrated and described by way of example one embodiment in which the invention may be practiced, it will be understood that I do not limit myself to such embodiment, but intend to cover all variations of the invention which may come within the scope of the appended claims. In this connection, it will be evident to those skilled in this art that the apparatus disclosed may be employed to control the hydraulic flow differently from that disclosed. Thus, as has been indicated, the apparatus may be constructed to maintain an upstream control of the liquid level. To attain this result, the float 20 may be positioned on the same side of the pivot 12 as the gate 10, or both the float 20 and ballast chambers 30, 31 may be placed on the same side of the pivot 12 as the gate 10. On the other hand, the ballast chambers 30, 31 can be positioned on the opposite side of pivot 12 from float 20 in establishing both upstream and downstream control. It is obvious that the number of ballasting compartments may be greater than two and that the setting operations described may be accomplished with all or a part of the added ballasting material. The compartments need not be of the same width as the float or of the channel and may in fact be composed of a series of spaced compartments. The float can also be divided into two or more floats and need not extend completely across the channel.

I claim:

1. A hydraulic gate structure for controlling the flow of liquid in a channel, comprising a gate apron extending across the channel, a float engageable by the liquid in said channel, means supporting said gate apron and said float for pivotal movement about a horizontal axis extending across said channel, and means for balancing the structure at a center of gravity positioned to enable the structure to be in equilibrium at two different positions corresponding to any two predetermined heights of the liquid level to be regulated, the mass of said gate apron, float, and supporting and balancing means being predetermined to provide said gate structure with a given center of gravity, said balancing means being located on said gate structure in a given, fixed position and including a plurality of superposed compartments movable concomitantly with said gate apron and said float about said axis and arranged vertically with relation to each other when said gate structure is in one of said positions, said compartments being fixed relative to said gate apron, float and supporting means, and being constructed and arranged to balance the gate at one of said positions, except for a given weight of ballast to be added to said compartments, and a mass of ballast constituted of an exact quantity of separable material deposited in said compartments at the place of installation of said gate structure, the approximate quantity of said ballast and the position of said compartments in said gate structure being predetermined to provide initially a condition of balance for said installed structure in said one position and the separable material constituting said ballast being shiftable at least in part in said compartments to attain, without a change in the quantity of said ballast and without moving said compartments from said given position and the center of gravity of the gate structure vertically from the position thereof in said one position of said gate structure, a condition of balance for said structure in said other position.

2. A hydraulic gate comprising a structure providing an apron adapted to be disposed generally vertically with its length extending across a generally horizontally extending hydraulic channel for controlling hydraulic flow through said channel, said structure also providing a float engageable by the hydraulic fluid in said channel, said structure being capable of being supported on a support for pivotal movement thereof on an axis generally parallel to said length of said apron, said structure providing means connecting said apron and said float for movement of said apron concomitantly with said float about said axis in response to variation of the level of the hydraulic fluid in said channel, a container supported by said structure for pivotal movement thereof about said axis concomitantly with said pivotal movement of said structure, said container providing a bottom wall disposed transversely of said apron and providing walls spaced in the direction transversely of said apron and extending generally upwardly with respect to said bottom wall to define said container with said bottom wall, said container also providing a wall disposed above said bottom wall and extending in the direction transversely of said apron and dividing said container into two compartments disposed generally one above the other in vertically aligned relation in one position of said structure for containing ballast for balancing said gate in two different positions thereof, said ballast for said container being constituted of an exact quantity of separable material deposited in said compartments at the place of installation of said gate structure, the mass of said gate structure, the positions of said container compartments in said gate structure and the approximate quantity of said ballast being predetermined to provide said gate structure as a whole with a given center of gravity and to provide for equilibrium of the installed gate structure in said one position, whereby the separable material constituting said ballast may be shifted in said compartments to attain, without changing the quantity of such ballast and without moving the center of gravity of the gate vertically from the position thereof in said one position of said structure, a condition of balance for said gate structure in said other position.

3. A hydraulic gate as defined in claim 2 in which said bottom wall and said dividing wall are disposed so as to be substantially horizontal in said one position of said gate, and upwardly extending walls being substantially perpendicular to said horizontal bottom and dividing walls in said one position of said gate.

4. A hydraulic gate as defined in claim 2 in which said container is formed in the interior of said float and is located in the upper unsubmerged portion of said float, said container and float being at the opposite side of said pivotal axis from said apron.

5. A hydraulic gate as defined in claim 2 in which said container and said float both are at the opposite side of said pivot from said apron.

6. A hydraulic gate comprising a structure providing an apron adapted to be disposed generally vertically with its length extending across a generally horizontally extending hydraulic channel for controlling hydraulic flow through said channel, said structure also providing a float engageable by the hydraulic fluid in said channel, said structure being capable of being supported on a support for pivotal movement thereof on an axis extending generally parallel to said length of said apron, said apron being located on one side of said axis and said structure providing means connecting said apron and said float for movement of said apron concomitantly with said float about said axis in response to variation of the level of the hydraulic fluid in said channel, and means defining a mass supported by said structure for pivotal movement thereof concomitantly with said structure about said axis, said mass having given external dimensions, being disposed in horizontally offset relation to said pivotal axis and spaced from said apron on the other side of said axis at a given fixed position, and being of such given weight that the moment thereof about said axis balances the moment of the buoyancy of said float about said axis in the open position of said gate with said float submerged to the degree determined by the level of the hydraulic fluid to be controlled in said channel, the center of gravity of said mass in said open position of said gate being disposed at a level not below the level of said pivotal axis a distance such that in the closed position of said gate in which said float is submerged less than the submergence thereof in said open position of said gate the moment of said mass about said pivotal axis is reduced relative to the moment of said mass about said axis in the open position of said gate so as substantially to balance the moment of the buoyancy of said float in its position when said gate is in said closed position, said mass being constituted of a plurality of compartments arranged on said gate structure so as to be in vertical alignment in the open position of said gate and of an exact quantity of separable material deposited in said compartments at the place of installation of said gate structure, the approximate quantity of said separable material and the vertical positions of said compartments and said center of gravity in said gate structure being predetermined with reference to the open position of said gate, and said exact quantity of said separable material after having been added to establish initially said vertical position of said center of gravity in the open position of said gate, being thereafter shifted at least in part in said compartments to bring said center of gravity to said position in which the moments are balanced for both the open and closed positions of said gate, without moving the same from said vertical position and without changing the given fixed position of said mass or its given external dimensions.

7. The method of balancing a hydraulic gate structure having a compensated float comprising positioning a plurality of compartments at a given fixed place on such structure and in a given superposed vertical relation for one position of said structure corresponding to a predetermined height of the liquid level to be regulated, loading a given weight of a mass of ballasting material composed of loose, separable parts indiscriminately into said compartments while the structure is in said position until the latter has attained a condition of balance for such position, and then while said structure is in a different position corresponding to a predetermined height of the liquid level to be regulated shifting vertically a portion of the ballasting material in at least one of said compartments to another of such compartments until said structure is balanced in said different position thereof, and without changing the fixed place of such compartments or their given external dimensions.

8. The method of balancing a hydraulic gate having a structure providing an apron disposed generally vertically and with its length extending across a generally horizontally extending hydraulic channel for controlling hydraulic flow through said channel, said structure providing a float engageable by the hydraulic fluid in said channel, said structure being supported for pivotal movement thereof about an axis extending generally parallel to the length of said apron, said apron being located on one side of said axis and said structure providing means connecting said apron and said float for movement of said apron concomitantly with said float about said axis in response to variation of the level of the hydraulic fluid in said channel, said method comprising the steps of supporting a given weight of a mass of ballasting material composed of loose separable parts within a given volume at a given fixed place on said structure to position the center of gravity of the structure above the level of and offset from said pivotal axis so as to provide a given moment of said mass acting in a vertical line and about said pivotal axis in the open position of said gate, shifting a portion of such parts of the mass within said given volume and without changing the given volume of said mass or the fixed place thereof to shift the center of gravity along said vertical line established with said gate in said open position to a new position while said gate is in the closed position and said vertical line becomes inclined to the vertical and until the moment of said mass in the new position thereof about said pivotal axis will balance the gate in the closed position thereof.

9. The method of balancing a hydraulic gate structure having a compensated float comprising the steps of locating a receptacle of given external dimensions on said structure at a given fixed place offset from the pivotal axis of said structure and in such relation to the parts of said structure that upon the addition of a given weight of material to said receptacle said structure may be brought to a condition of balance, adding to the receptacle such given weight of a separable mass of ballasting material while said structure is in a position corresponding to a predetermined height of the liquid level to be regulated and until said structure has attained a condition of balance for such position, to establish the given vertical position of the center of gravity of such gate structure, and then while said structure is in another position thereof corresponding to a predetermined height of the liquid level to be regulated, shifting a portion at least of the ballasting material within said receptacle without changing the fixed position of the receptacle or its given external dimensions, and in a direction relative to said structure to move such center of gravity in the direction of a vertical line passed through the position of such center of gravity for said structure established relative to said structure in said initial balancing step, and continuing such shifting operation until said structure is balanced in said other position thereof.

10. A hydraulic gate comprising a structure providing an apron adapted to be disposed generally vertically with its length extending across generally horizontally extending hydraulic channel for controlling hydraulic flow through said channel, said structure also providing a float engageable by the hydraulic fluid in said channel, said structure being capable of being supported on a support for pivotal movement thereof on an axis extending generally parallel to said length of said apron, said apron being located on one side of said axis and said structure providing means connecting said apron and said float for movement of said apron concomitantly with said float about said axis in response to variation of the level of the hydraulic fluid in said channel, and means defining a mass supported by said structure for pivotal movement thereof concomitantly with said structure about said axis, said mass having given external dimensions, being disposed in horizontally offset relation to said pivotal axis and spaced from said apron on the other side of said axis at a given fixed position, and being of such given weight that the moment thereof about said axis balances the moment of the buoyancy of said float about said axis in the open position of said gate with said float submerged to the degree determined by the level of the hydraulic fluid to be controlled in said channel, the center of gravity of said mass in said open position of said gate being disposed at a level not below the level of said pivotal axis a distance such that in the closed position of said gate in which said float is submerged less than the submergence thereof in said open position of said gate the moment of said mass about said pivotal axis is reduced relative to the moment of said mass about said axis in the open position of said gate so as substantially to balance the moment of the buoyancy of said float in its position when said gate is in said closed position, said mass being constituted of a receptacle mounted on said structure at said given fixed position and formed to provide a given capacity, and of an exact weight of weighting means adjustably positioned in said receptacle at the place of installation of said gate structure, the weight of said weighting means, and the vertical positions of said receptacle and said center of gravity in said gate structure being approximately predetermined with reference to the open position of said gate, said weighting means being rearrangeable internally within the given capacity of the receptacle without change in the later, said weighting means being adjustable within said receptacle to effect initially said vertical position of said center of gravity in the open position of said gate, and being also adjustable within said receptacle to bring said center of gravity of said position in which the moments are balanced for both the open and closed positions of said gate, without moving the same from said vertical position and without changing the given fixed position of said mass or its given external dimensions.

References Cited in the file of this patent

FOREIGN PATENTS 461,381    Great Britain _____ 1937

OTHER REFERENCES

Engineering News-Record, Aug. 10, 1950, page 35.